(12) United States Patent
Kim

(10) Patent No.: US 11,724,730 B2
(45) Date of Patent: Aug. 15, 2023

(54) STEERING COLUMN AND STEERING APPARATUS INCLUDING THE SAME

(71) Applicant: HL MANDO CORPORATION, Pyeongtaek-si (KR)

(72) Inventor: Jonghan Kim, Anyang-si (KR)

(73) Assignee: HL Mando Corporation, Pyeongtaek-si (KR)

( * ) Notice: Subject to any disclaimer, the term of this patent is extended or adjusted under 35 U.S.C. 154(b) by 0 days.

(21) Appl. No.: 17/520,048

(22) Filed: Nov. 5, 2021

(65) Prior Publication Data
US 2022/0153335 A1    May 19, 2022

(30) Foreign Application Priority Data

Nov. 19, 2020  (KR) .................. 10-2020-0155935

(51) Int. Cl.
| | |
|---|---|
| *B62D 1/18* | (2006.01) |
| *F16C 33/04* | (2006.01) |
| *F16C 17/26* | (2006.01) |
| *F16C 27/02* | (2006.01) |
| *F16C 11/04* | (2006.01) |

(52) U.S. Cl.
CPC .............. *B62D 1/18* (2013.01); *F16C 11/04* (2013.01); *F16C 17/26* (2013.01); *F16C 27/02* (2013.01); *F16C 33/04* (2013.01); *F16C 2326/24* (2013.01)

(58) Field of Classification Search
CPC .......... B62D 1/18; B62D 5/0409; B62D 1/16; B62D 5/04; F16C 11/04; F16C 17/26; F16C 27/02; F16C 33/04; F16C 2326/24; F16C 35/042; F16C 19/06; F16C 2322/14; B21D 19/12
See application file for complete search history.

(56) References Cited

U.S. PATENT DOCUMENTS

| | | | | |
|---|---|---|---|---|
| 4,541,742 A | * | 9/1985 | Lederman | B62D 1/16 384/526 |
| 4,967,858 A | * | 11/1990 | Kotake | B62D 6/10 439/15 |
| 5,195,383 A | * | 3/1993 | Tanaka | B62D 6/10 73/862.325 |
| 5,538,282 A | * | 7/1996 | White | B62D 1/16 280/775 |
| 5,590,565 A | * | 1/1997 | Palfenier | B62D 1/195 74/531 |
| 9,637,157 B2 | * | 5/2017 | Bless | B62D 1/16 |
| 2002/0029923 A1 | * | 3/2002 | Tanioka | B62D 5/0403 180/444 |
| 2004/0060766 A1 | * | 4/2004 | Hayakawa | H02K 11/33 180/444 |

(Continued)

*Primary Examiner* — Drew J Brown
(74) *Attorney, Agent, or Firm* — Morgan, Lewis & Bockius LLP

(57) ABSTRACT

An embodiment of the present disclosure relates to a steering column disposed in a steering apparatus including a housing cover connected to a drive unit housing and a bearing disposed in the housing cover, the steering column including: a main body elongated in one direction and having one side inserted into and supported by the housing cover; an enlarged diameter portion formed as one side of the main body expands in diameter; and a through-hole penetratively formed in an outer periphery of the enlarged diameter portion so as to be coupled to the housing cover.

11 Claims, 4 Drawing Sheets

(56) References Cited

U.S. PATENT DOCUMENTS

| | | | |
|---|---|---|---|
| 2004/0182637 A1* | 9/2004 | Yamamori | B62D 5/0409 180/421 |
| 2005/0173183 A1* | 8/2005 | Chikaraishi | F16H 57/0412 180/444 |
| 2006/0086559 A1* | 4/2006 | Segawa | F16D 3/68 180/444 |
| 2008/0000316 A1* | 1/2008 | Kurokawa | B62D 1/185 464/89 |
| 2011/0120798 A1* | 5/2011 | Kawada | B62D 5/0409 180/444 |
| 2014/0318302 A1* | 10/2014 | Watanabe | B62D 1/185 74/493 |
| 2014/0352468 A1* | 12/2014 | Kim | B62D 5/0409 74/409 |
| 2016/0288816 A1* | 10/2016 | Kelly | B62D 1/16 |
| 2017/0096159 A1* | 4/2017 | Sulser | F16C 35/067 |
| 2020/0406956 A1* | 12/2020 | Watzlawek | F16C 35/067 |
| 2021/0078631 A1* | 3/2021 | Weber | B62D 15/021 |
| 2021/0206419 A1* | 7/2021 | Specht | F16H 25/20 |

\* cited by examiner

[FIG.1]
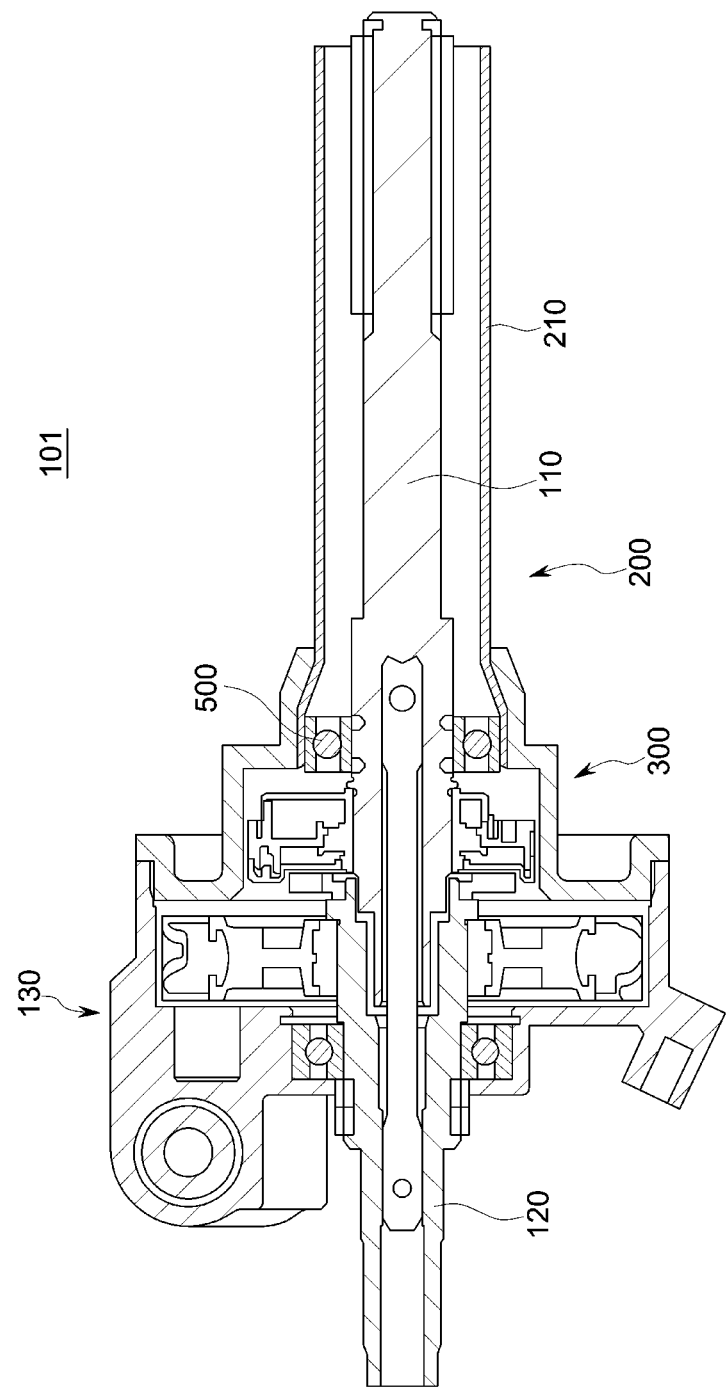

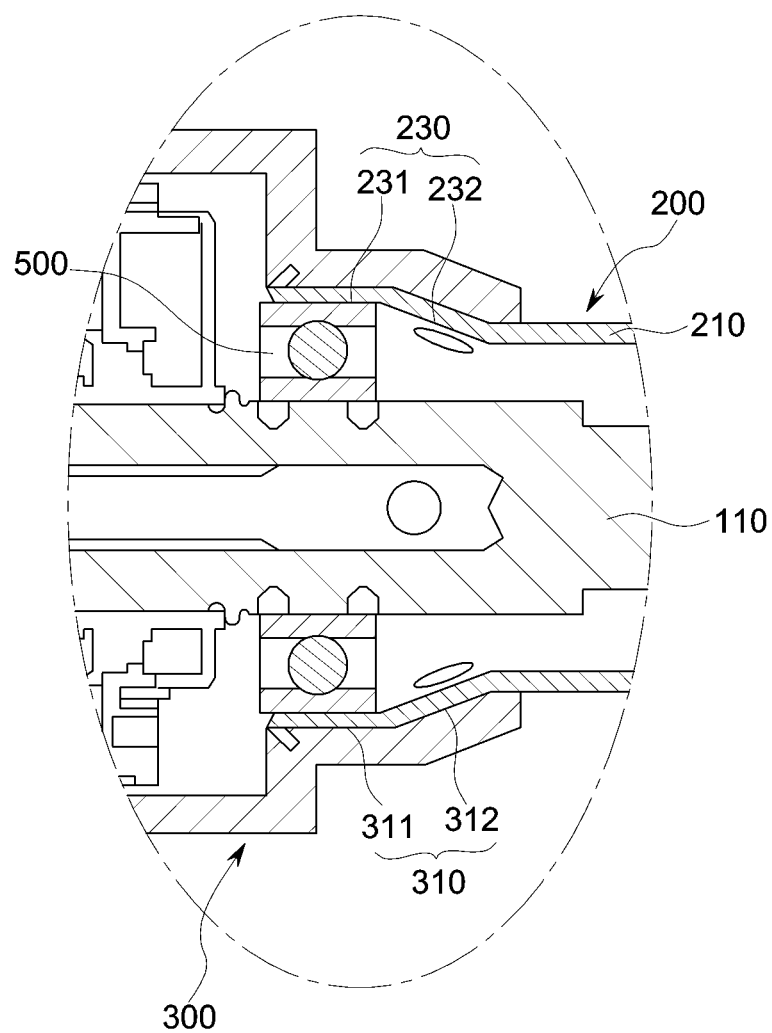
[FIG.2]

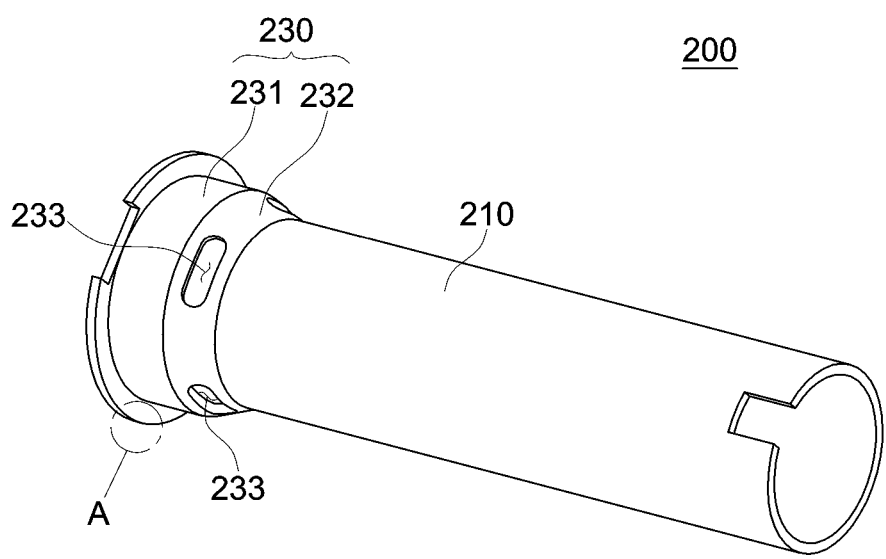
[FIG.3]

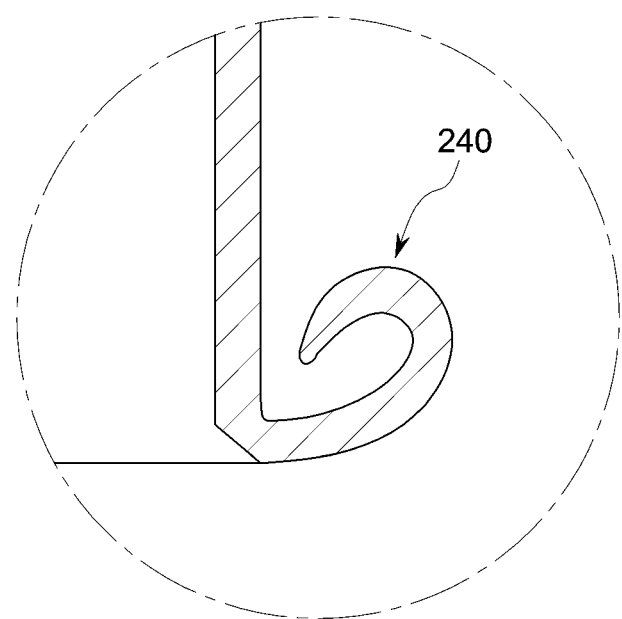
[FIG.4]

STEERING COLUMN AND STEERING APPARATUS INCLUDING THE SAME

CROSS-REFERENCE TO RELATED APPLICATIONS

This application claims benefit and priority to Korean Patent Application No. 10-2020-0155935, filed on Nov. 19, 2020, with the Korean Intellectual Property Office, the disclosure of which is incorporated herein in its entirety by reference.

TECHNICAL FIELD

The present disclosure relates to a steering column and a steering apparatus including the same, and more particularly, to a steering column capable of being easily coupled to a housing cover and prevented from separating from the housing cover when impact is transmitted, and a steering apparatus including the same.

BACKGROUND

In general, a steering apparatus steers wheels of a vehicle by providing auxiliary torque to a rotation of a steering wheel manipulated by an operator. The auxiliary torque facilitates the manipulation of the wheels in cooperation with a rotational force transmitted from the steering wheel by a motor and a speed reducer including a worm gear.

The steering apparatus includes a housing cover and a steering column. An outer peripheral surface of one end of the housing cover and an inner peripheral surface of the steering column are processed, and then the housing cover and the steering column are coupled by being press-fitted with each other in a state in which the processed surfaces face each other.

Specifically, to couple the housing cover and the steering column, it is necessary to process the outer peripheral surface of one end of the housing cover, process the inner peripheral surface of the steering column, and fix the housing cover and the steering column in a press-fitted manner.

In this case, the process of processing the surfaces, the time required to process the surfaces, and the process of press-fitting the housing cover and the steering column are required. However, even though the process is complicated and the housing cover and the steering column are press-fitted with each other, it is difficult to maintain the coupled state between the housing cover and the steering column due to impact applied between the housing cover and the steering column.

That is, there is a need for a steering column capable of being easily coupled to the housing cover and prevented from separating from the housing cover due to impact, and a steering apparatus 101 including the same.

SUMMARY

The present disclosure has been made in an effort to provide a steering column capable of being easily coupled to a housing cover and prevented from separating from the housing cover when impact is transmitted, and a steering apparatus including the same.

An exemplary embodiment of the present disclosure provides a steering column disposed in a steering apparatus including a housing cover connected to a drive unit housing and a bearing disposed in the housing cover, the steering column including: a main body elongated in one direction and having one side inserted into and supported by the housing cover; an enlarged diameter portion formed as one side of the main body expands in diameter; and a through-hole penetratively formed in an outer periphery of the enlarged diameter portion so as to be coupled to the housing cover.

At least a part of an inner portion of the enlarged diameter portion may be disposed to face an outer peripheral surface of the bearing.

One end of the enlarged diameter portion may be curled.

The enlarged diameter portion may further include: a first enlarged diameter portion facing the outer peripheral surface of the bearing; and a second enlarged diameter portion having a smaller inner peripheral surface than the first enlarged diameter portion and having a diameter that decreases from the first enlarged diameter portion toward the other side of the main body.

Another exemplary embodiment of the present disclosure provides a steering apparatus configured to transmit a rotation of an input shaft, which is manipulated by a steering wheel, to an output shaft connected to a drive unit housing, the steering apparatus including: a housing cover in which one side of the input shaft is disposed; a bearing configured to support a rotation of the input shaft disposed in the housing cover; and a steering column having one side disposed between the bearing and the housing cover and having a hollow portion therein, the steering column having an inner surface spaced apart from an outer periphery of the input shaft.

The steering column may further include an enlarged diameter portion having one side disposed in the housing cover and expanding in diameter.

The steering column may further include a through-hole penetratively formed in an outer peripheral surface of the enlarged diameter portion.

The enlarged diameter portion may include: a first enlarged diameter portion facing an outer peripheral surface of the bearing; and a second enlarged diameter portion having the through-hole and having a smaller inner peripheral surface than the first enlarged diameter portion.

The second enlarged diameter portion may be inclined so that an inner diameter thereof decreases toward the other side of the steering column.

The cover housing may include: a first housing support portion formed to surround the first enlarged diameter portion; and a second housing support portion formed to surround the second enlarged diameter portion and having a smaller inner peripheral surface of the first housing support portion.

One end of the enlarged diameter portion of the steering column may be curled.

The housing cover may be injection-molded.

The housing cover may include an engineering plastic material.

The housing cover and the steering column may be made of different materials.

According to the steering column and the steering apparatus including the same according to the embodiment of the present disclosure, the steering column may be easily coupled to the housing cover and effectively prevented from separating from the housing cover when impact is transmitted.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a view illustrating a steering column disposed on a steering apparatus according to the embodiment of the present disclosure.

FIG. 2 is an enlarged view of a section in which a housing cover and the steering column illustrated in FIG. 1 are coupled.

FIG. 3 is a perspective view of the steering column illustrated in FIG. 1.

FIG. 4 is an enlarged cross-sectional view of region A illustrated in FIG. 3.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways, and is not limited to the embodiments described herein.

It is noted that the drawings are schematic and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Embodiments of the present disclosure illustrate ideal embodiments of the present disclosure in detail. As a result, various modifications of the drawings are expected. Therefore, the embodiments are not limited to specific forms in regions illustrated in the drawings, and for example, include modifications of forms by the manufacture thereof.

Hereinafter, a steering column 200 according to an embodiment of the present disclosure will be described with reference to FIGS. 1 to 4.

As illustrated in FIG. 1, a steering apparatus 101 includes a drive unit housing 130, a housing cover 300, and a bearing 500. Further, the steering column 200 is disposed in the steering apparatus 101.

The drive unit housing 130 accommodates a worm speed reducer, a torque measurer, a gear, or the like and supports an electric motor configured to provide auxiliary torque in a direction in which a steering wheel is manipulated.

The housing cover 300 is coupled to the drive unit housing 130. The bearing 500 is disposed in the housing cover 300 and may support a part of an input shaft 110 positioned in the housing cover 300 so that the input shaft 110 is rotatable. Specifically, the input shaft 110 may be connected to the steering wheel and rotate in conjunction with the rotation of the steering wheel.

As illustrated in FIGS. 2 and 3, the steering column 200 according to the embodiment of the present disclosure includes a main body 210, an enlarged diameter portion 230, and through-holes 233.

One side of the main body 210 is inserted into and supported by the housing cover 300. In addition, the main body 210 may have a hollow portion therein. Specifically, one region of the input shaft 110 may be disposed in the main body 210.

In the inside of one side of the main body 210, the enlarged diameter portion 230 has a larger diameter than other regions of the main body 210. Specifically, the enlarged diameter portion 230 may be disposed at one side of the main body 210 inserted into the housing cover 300.

The through-holes 233 may penetrate an outer periphery of the enlarged diameter portion 230. In addition, the through-holes 233 may penetrate the outer periphery of the enlarged diameter portion 230 disposed at one side of the main body 210 so that an inner peripheral surface of the housing cover 300 is effectively coupled to one side of the main body 210.

For example, the through-hole 233 may be provided in plural, and the plurality of through-holes 233 may be spaced apart from one another along the outer periphery of the enlarged diameter portion 230.

Therefore, the steering column 200 according to the present disclosure may be effectively coupled to the housing cover 300 by means of the enlarged diameter portion 230. That is, the steering column 200 may be effectively coupled to the housing cover 300 without processing an inner surface of the steering column 200 and processing a surface of the housing cover 300 coupled to the inner surface of the steering column 200.

A part of the enlarged diameter portion 230 of the steering column 200 according to the embodiment of the present disclosure may be disposed to face an outer peripheral surface of the bearing 500.

At least a part of an inner peripheral surface of the enlarged diameter portion 230 may be disposed to face the outer peripheral surface of the bearing 500. Specifically, the enlarged diameter portion 230 of the main body 210 may be disposed between the outer peripheral surface of the bearing 500 and an inner portion of the housing cover 300. The bearing 500 may support a rotation of the input shaft 110.

That is, a part of an inner surface of the enlarged diameter portion 230 may support the outer peripheral surface of the bearing 500, and an outer peripheral surface of the enlarged diameter portion 230 may be supported by the housing cover 300.

One end of the enlarged diameter portion 230 according to the embodiment of the present disclosure may be curled.

One end of the enlarged diameter portion 230 may be curled so that a cross-section of an outer peripheral end thereof has a circular curved surface. Specifically, one end of the enlarged diameter portion 230 may be one endmost portion of the main body 210. That is, one end of the enlarged diameter portion 230 is curled to have a curved surface directed toward the outer peripheral surface from the inner peripheral surface, thereby defining a curled portion 240.

One end of the enlarged diameter portion 230 may be curled and thus effectively coupled to the housing cover 300. That is, since one end of the enlarged diameter portion 230 may be curled, it is possible to effectively prevent the steering column 200 from separating from the housing cover 300 in the other direction of the main body 210 when the steering column 200 is coupled to the housing cover 300.

One end of the enlarged diameter portion 230, which is curled, may absorb impact applied between the housing cover 300 and the main body 210.

The enlarged diameter portion 230 of the steering column 200 according to the embodiment of the present disclosure may further include a first enlarged diameter portion 231 and a second enlarged diameter portion 232.

The first enlarged diameter portion 231 may face the outer peripheral surface of the bearing 500. Specifically, the first enlarged diameter portion 231 may be disposed to be relatively closer to one end of the main body 210, which is curled, than is the second enlarged diameter portion 232. In addition, the first enlarged diameter portion 231 may have a diameter larger than an inner diameter of the other side of the main body 210 and be disposed such that an inner peripheral surface of the first enlarged diameter portion 231 supports the outer peripheral surface of the bearing 500.

The second enlarged diameter portion 232 may have a smaller inner peripheral surface than the first enlarged diameter portion 231. In addition, the second enlarged diameter portion 232 may be disposed between the first enlarged diameter portion 231 and the other side of the main body 210. Further, the second enlarged diameter portion 232 may have a diameter that decreases from the first enlarged diameter portion 231 toward the other side of the main body 210. Specifically, the second enlarged diameter portion 232 may be inclined at an angle so that the diameter thereof decreases toward the other side of the main body 210. That is, the second enlarged diameter portion 232 may have a gradient so that an inner diameter thereof decreases toward the other direction of the main body 210 in a longitudinal direction of the main body 210.

The through-holes 233 may be formed in the second enlarged diameter portion 232.

Therefore, the steering column 200 according to the embodiment of the present disclosure may be effectively coupled to the housing cover 300.

Hereinafter, the steering apparatus 101 including the steering column 200 according to the embodiment of the present disclosure will be described with reference to FIGS. 1 to 4.

The steering apparatus 101 includes the input shaft 110 configured to be manipulated by the steering wheel, and an output shaft 120 connected to the drive unit housing 130 and configured to transmit the rotation of the input shaft 110. The output shaft 120 provides rotational torque for rotating the wheel.

The drive unit may provide auxiliary torque in the rotation direction of the input shaft 110 rotated by the steering wheel, such that high rotational torque is transmitted to the output shaft 120. That is, the drive unit may provide auxiliary torque to allow the wheels to be smoothly rotated by the steering wheel rotated by the operator.

The drive unit housing 130 accommodates the worm speed reducer, the torque measurer, the gear, or the like and supports the electric motor which is the drive unit that provides auxiliary torque in the direction in which the steering wheel is manipulated. In addition, the output shaft 120 may be disposed in the drive unit housing 130. The output shaft 120 may receive the rotation of the input shaft 110.

As illustrated in FIG. 1, the steering apparatus 101 includes the housing cover 300, the bearing 500, and the steering column 200.

One side of the input shaft 110 may be disposed in the housing cover 300. In addition, the housing cover 300 may be supported by the drive unit housing 130. Specifically, the housing cover 300 has a hollow portion therein, such that a part of the input shaft 110 may be disposed in the housing cover 300. In addition, the input shaft 110 may penetrate one side of the housing cover 300. Further, the other side of the housing cover 300 may be supported by the drive unit housing 130.

The bearing 500 may be disposed in the housing cover 300 and support the rotation of the input shaft 110 disposed in the housing cover 300.

One side of the steering column 200 is disposed between the bearing 500 and the housing cover 300. In addition, the steering column 200 has a hollow portion therein. Further, one region of the input shaft 110 may be disposed in the steering column 200.

The steering column 200 may be elongated in one direction. A central axis in a longitudinal direction of the input shaft 110 may be disposed coaxially with a central axis in a longitudinal direction of the steering column 200. Further, one region of the input shaft 110 may be disposed in the hollow portion of the steering column 200.

Specifically, the input shaft 110 is connected to the non-illustrated steering wheel and may receive a rotational force made as the driver manipulates the steering wheel.

One side of the steering column 200 may be disposed and supported between the bearing 500 and one side of the housing cover 300. That is, one side of the input shaft 110 may be disposed to penetrate the housing cover 300 and the steering column 200.

That is, one side of the housing cover 300 and one side of the steering column 200 are coupled, and the bearing 500 may be disposed at one side of the steering column 200 coupled to one side of the housing cover 300.

Therefore, in the steering apparatus 101, the housing cover 300 and the steering column 200 may be effectively coupled. That is, the housing cover 300 and the steering column 200 may be coupled without a separate device and surface processing.

The steering column 200 of the steering apparatus 101 according to the embodiment of the present disclosure may further include the enlarged diameter portion 230.

The enlarged diameter portion 230 may be formed as one side of the steering column 200 disposed in the housing cover 300 expands in diameter. Specifically, the enlarged diameter portion 230 may be inserted into one side of the housing cover 300, such that the housing cover 300 and the steering column 200 may be coupled.

The enlarged diameter portion 230 may allow the housing cover 300 and the steering column 200 to be easily coupled.

The steering column 200 of the steering apparatus 101 according to the embodiment of the present disclosure may further include the through-holes 233.

The through-hole 233 may penetrate the outer peripheral surface of the enlarged diameter portion 230. Specifically, the through-hole 233 may be provided in plural, and the plurality of through-holes 233 may be spaced apart from one another along the outer peripheral surface of the enlarged diameter portion 230. Since the through-hole 233 is formed in the outer peripheral surface of the enlarged diameter portion 230, the enlarged diameter portion 230 may be effectively coupled to the inner surface of one side of the housing cover 300.

The enlarged diameter portion 230 of the steering apparatus 101 according to the embodiment of the present disclosure may include the first enlarged diameter portion 231 and the second enlarged diameter portion 232.

The first enlarged diameter portion 231 may face the outer peripheral surface of the bearing 500. Specifically, the inner peripheral surface of the first enlarged diameter portion 231 may be disposed to face the outer peripheral surface of the bearing 500.

The second enlarged diameter portion 232 may have a smaller inner peripheral surface than the first enlarged diameter portion 231. In addition, the through-holes 233 may be formed in the second enlarged diameter portion 232. Specifically, the second enlarged diameter portion 232 may be disposed to be closer to the other side of the steering apparatus 101 than is the first enlarged diameter portion 231. In addition, the second enlarged diameter portion 232 may be inclined in a direction in which the inner diameter thereof decreases toward the other side of the steering apparatus 101.

That is, an inner diameter of a portion of the second enlarged diameter portion 232, which is adjacent to the first enlarged diameter portion 231, may be relatively smaller than an inner diameter of a portion of the second enlarged diameter portion 232 which is adjacent to the other side of the steering apparatus 101. In addition, an outer diameter of the second enlarged diameter portion 232 may also be smaller than an outer diameter of the first enlarged diameter portion 231.

The first enlarged diameter portion 231 and the inclined second enlarged diameter portion 232 may have different inner diameters, such that the first enlarged diameter portion 231 and the second enlarged diameter portion 232 may be securely coupled to the inner portion of the housing cover 300. That is, the first enlarged diameter portion 231 and the second enlarged diameter portion 232 may effectively prevent the enlarged diameter portion from separating from the housing cover 300 due to external impact.

One end of the enlarged diameter portion 230 of the steering column 200 of the steering apparatus 101 according to the embodiment of the present disclosure may be curled.

One end of the enlarged diameter portion 230 may be one endmost portion of the steering column 200. At one end of the enlarged diameter portion 230, the inner peripheral surface of the enlarged diameter portion 230 may be bent toward the outer peripheral surface of the enlarged diameter portion 230. Specifically, one end of the enlarged diameter portion 230 may be curled so that the inner peripheral surface of the enlarged diameter portion 230 is bent to have a circular cross-section toward the outer peripheral surface of the enlarged diameter portion 230.

One end of the enlarged diameter portion 230, which is curled, absorbs impact when a load is applied to the housing cover 300 and the steering column 200 due to external impact, thereby effectively preventing the deformation of the steering column 200.

The housing cover 300 of the steering apparatus 101 according to the embodiment of the present disclosure may include a first housing support portion 311 and a second housing support portion 312. That is, one side 310 of the housing cover 300 may include the first housing support portion 311 and the second housing support portion 312.

The first housing support portion 311 may be formed at one side of the housing cover 300 and surround the first enlarged diameter portion 231. That is, an inner peripheral surface of the first housing support portion 311 may support an outer peripheral surface of the first enlarged diameter portion 231.

The second housing support portion 312 may be formed at one side of the housing cover 300 and surround the second enlarged diameter portion 232. In addition, the second housing support portion 312 may have a smaller inner peripheral surface than the first housing support portion 311.

Further, the second housing support portion 312 may be formed to be identical to the second enlarged diameter portion 232 so that an inner peripheral surface of the second housing support portion 312 engages with the inclined outer peripheral surface of the second enlarged diameter portion 232.

That is, the inner peripheral surface of the second housing support portion 312 may gradually become narrower in the direction toward one end of the housing cover 300.

The second housing support portion 312 may be in contact with the through-hole 233 formed in the second enlarged diameter portion 232.

Therefore, since the inner diameter of the first housing support portion 311 and the inner diameter of the second housing support portion 312 are different from each other, the first enlarged diameter portion 231 and the second enlarged diameter portion 232 may be easily supported.

Therefore, even though impact is applied to the housing cover 300 and the steering column 200, the housing cover 300 and the steering column 200 may be easily kept coupled. That is, since the inner diameter of the first housing support portion 311 and the inner diameter of the second housing support portion 312 are different from each other, the housing cover 300 and the steering column 200 are prevented from separating from each other.

The housing cover 300 according to the embodiment of the present disclosure may be injection-molded.

After the injection molding, the housing cover 300 may be coupled to one side of the steering column 200 in a state in which the housing cover 300 is in a molten state. Therefore, the first housing support portion 311 of the housing cover 300 may be coupled to the first enlarged diameter portion 231, and the second housing support portion 312 may be coupled to the second enlarged diameter portion 232. Further, the molten material of the injection-molded housing cover 300 is inserted into the through-hole 233 of the second enlarged diameter portion 232, such that the housing cover 300 and one side of the steering column 200 may be easily coupled.

For example, the housing cover 300 according to the present disclosure may include an engineering plastic material.

The steering column 200 of the steering apparatus 101 according to the embodiment of the present disclosure may be manufactured by drawing.

The steering column 200 may be made of a material containing metal. Therefore, the housing cover 300 including the engineering plastic material may be made of a different material from the steering column 200.

Even though the housing cover 300 and the steering column 200 are made of different materials, the steering column 200 and the injection-molded housing cover 300 including the molten engineering plastic material may be easily coupled.

Therefore, according to the steering apparatus 101 according to the embodiment of the present disclosure, the housing cover 300 and the steering column 200 may be easily coupled, which makes it possible to easily prevent the housing cover 300 and the steering column 200 from separating from each other when impact is transmitted to the housing cover 300 and the steering column 200.

While the embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned exemplary embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A steering column disposed in a steering apparatus comprising a housing cover connected to a drive unit housing and a bearing disposed in the housing cover, the steering column comprising:
    a main body elongated in one direction and having one side inserted into and supported by the housing cover;
    an enlarged diameter portion formed as one side of the main body expands in diameter; and
    a through-hole penetratively formed in an outer periphery of the enlarged diameter portion so as to be coupled to the housing cover;
    wherein the enlarged diameter portion further comprises:
    a first enlarged diameter portion facing an outer peripheral surface of the bearing; and
    a second enlarged diameter portion having a smaller inner peripheral surface than the first enlarged diameter portion and having the through-hole.

2. The steering column of claim 1, wherein at least a part of an inner portion of the enlarged diameter portion is disposed to face the outer peripheral surface of the bearing.

3. The steering column of claim 2, wherein the second enlarged diameter portion has a diameter that decreases from the first enlarged diameter portion toward the other side of the main body.

4. The steering column of claim 1, wherein one end of the enlarged diameter portion is curled.

5. A steering apparatus configured to transmit a rotation of an input shaft, which is manipulated by a steering wheel, to an output shaft connected to a drive unit housing, the steering apparatus comprising:
    a housing cover in which one side of the input shaft is disposed;
    a bearing configured to support a rotation of the input shaft disposed in the housing cover; and
    a steering column having one side disposed between the bearing and the housing cover and having a hollow portion therein, the steering column having an inner surface spaced apart from an outer periphery of the input shaft,
    wherein the steering column further comprises an enlarged diameter portion having one side disposed in the housing cover and expanding in diameter,
    wherein the steering column further comprises a through-hole penetratively formed in an outer peripheral surface of the enlarged diameter portion, and
    wherein the enlarged diameter portion comprises:
    a first enlarged diameter portion facing an outer peripheral surface of the bearing; and
    a second enlarged diameter portion having the through-hole and having a smaller inner peripheral surface than the first enlarged diameter portion.

6. The steering apparatus of claim 5, wherein the second enlarged diameter portion is inclined so that an inner diameter thereof decreases toward the other side of the steering column.

7. The steering apparatus of claim 6, wherein the cover housing comprises:
    a first housing support portion formed to surround the first enlarged diameter portion; and
    a second housing support portion formed to surround the second enlarged diameter portion and having a smaller inner peripheral surface of the first housing support portion.

8. The steering apparatus of claim 5, wherein one end of the enlarged diameter portion of the steering column is curled.

9. The steering apparatus of claim 5, wherein the housing cover is injection-molded.

10. The steering apparatus of claim 9, wherein the housing cover includes an engineering plastic material.

11. The steering apparatus of claim 5, wherein the housing cover and the steering column are made of different materials.

* * * * *